May 8, 1951  B. N. HOFFSTROM  2,551,677
HYDRAULIC BRAKE ACTUATING MEANS
Filed Jan. 2, 1948  2 Sheets-Sheet 1
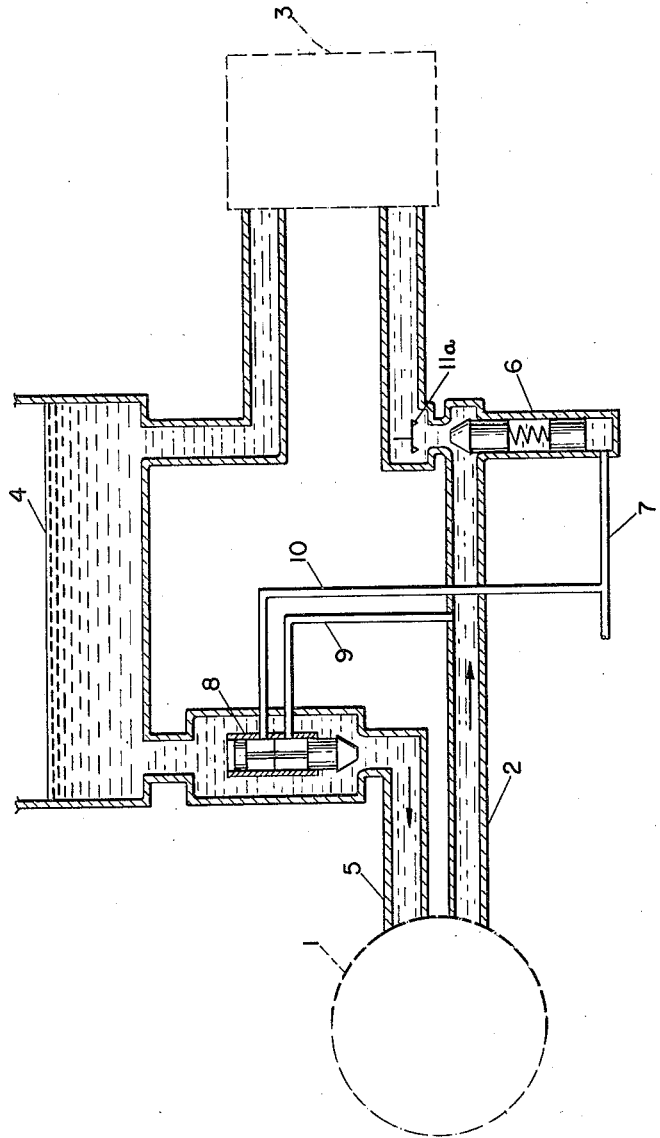
FIG. I
INVENTOR
BO NILSSON HOFFSTROM
BY
ATTORNEYS May 8, 1951 B. N. HOFFSTROM 2,551,677
HYDRAULIC BRAKE ACTUATING MEANS
Filed Jan. 2, 1948 2 Sheets-Sheet 2
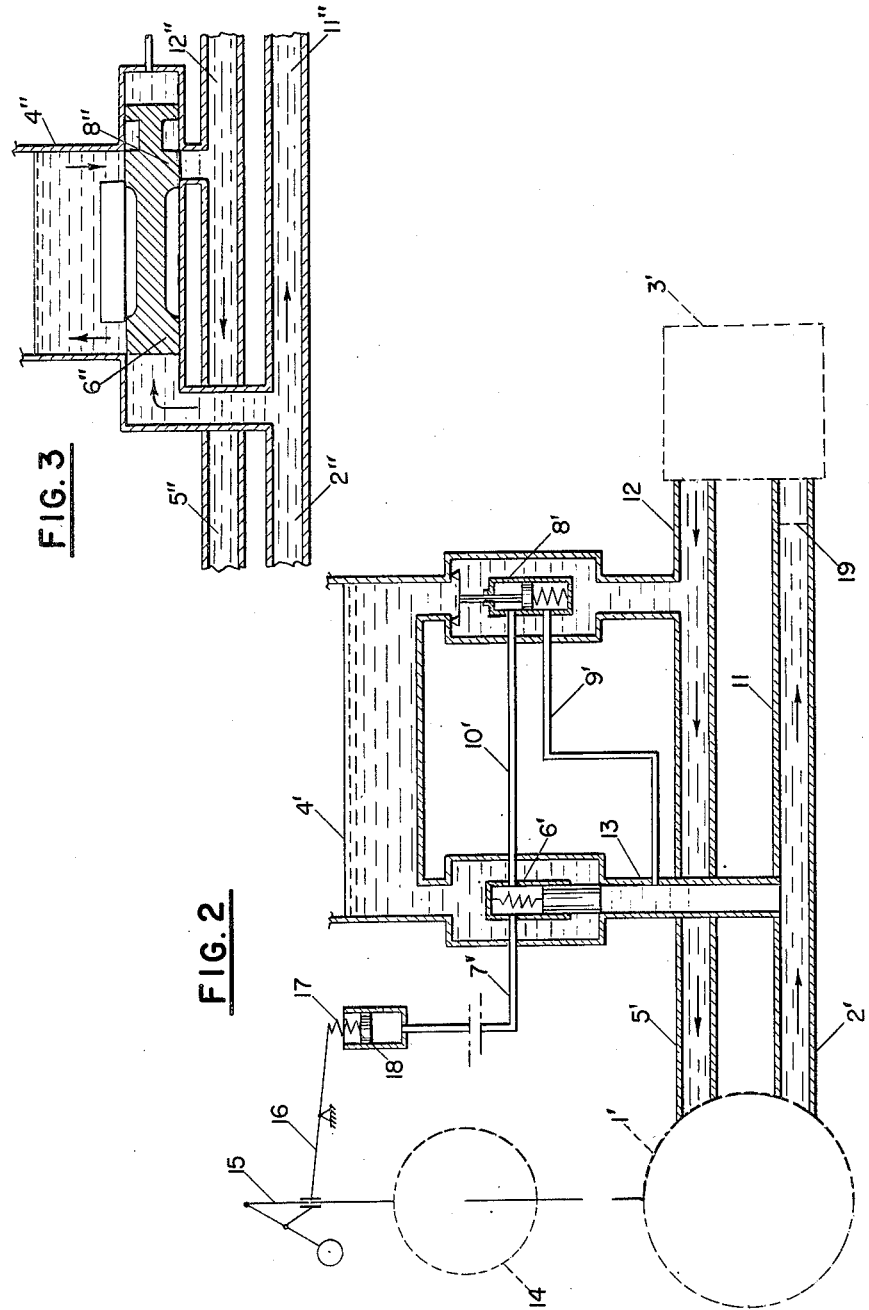
INVENTOR
BO NILSSON HOFFSTROM
BY
ATTORNEYS Patented May 8, 1951

2,551,677

UNITED STATES PATENT OFFICE 2,551,677

HYDRAULIC BRAKE ACTUATING MEANS

Bo Nilsson Hoffstrom, Abrahamsberg, Sweden

Application January 2, 1948, Serial No. 181
In Sweden February 18, 1947

6 Claims. (Cl. 188—90)

The present invention relates to hydraulic brake engine testing apparatus, particularly for aircraft engine testing plants in which an hydraulic brake, advantageously a modified disc brake, is employed to consume the energy delivered by the engine, the modified disc brake comprising a rotating disc acted upon by a fluid contained in a casing surrounding the disc rather than by brake shoes acting on its faces as in a standard disc brake.

In aircraft testing plants of this kind it is desirable that the load on the engine can be regulated. This may be done, for instance, in a known way by changing the conditions of liquid flow through the brake without change in the amount of liquid contained in it, so that the turbulence of the liquid is diminished (e. g. through the insertion of laminar shrouds) or increased. Yet another known method for the regulation of such brakes consists in changing the amount of liquid in the brake. Furthermore, in systems of this kind, a known means of speed regulation comprises a valve in the outlet for the brake liquid from the brake, which is actuated in the opening direction by the outlet pressure and in the closing direction by a force, which, by means of a special device, is made to vary as the square of the number of revolutions of the brake.

According to the present invention the braking moment of an hydraulic (or modified disc) brake is controlled by changing the amount of liquid in the brake, the system according to the invention being similar to the previously known system in that the outlet from the brake contains a valve, which is actuated in its opening direction by the outlet pressure. According to the present invention there is, however, a further valve in the inlet conduit to the brake, which is actuated in the closing direction by the outlet pressure. Both valves are influenced, in addition, by regulating forces.

If the system is designed for circulation of the brake liquid through a cooler, this may be connected between the outlet and the inlet of the brake in such a manner that the entire amount of liquid leaving the brake is made to pass through the regulating valves. A tank or reservoir should then be provided between the cooler and the brake inlet to stabilize the conditions of inflow to the brake and also to give room for the variations in the amount of liquid outside the brake, which occur consequent to regulation.

It may, however, be advantageous to have the outlet and inlet conduits with their valves connected to a reservoir containing a quantity of liquid which does not take part in the circulation, while that part of the liquid participating in the circulation flows from the outlet through the cooler to the inlet by-passing the valves. The latter may then be held closed in the state of stability, i. e. when no regulation is taking place, and will have to open only to admit or discharge liquid to or from the container when it is required to change the amount of liquid in the brake.

Since the regulation of the braking moment is attained through changes in the amount of liquid contained in the brake itself, it follows that, in a system of this kind, where the regulation may be said to be carried out through changes in the amount of liquid circulating in the system, provisions have to be made, which guarantee that a change in the amount of circulating liquid will completely effect a corresponding change in the amount of liquid in the brake, in other words, that the whole system except the brake is permanently filled with liquid.

The system may preferably be provided with automatic regulating means for influencing the regulating forces, which actuate the regulating valves, in response to some transmitting apparatus, such as a governor, which in turn responds to changes in engine speed, for example. These arrangements will be more fully set forth in connection with the various embodiments of the invention.

The brake liquid, in the following description, has been assumed to be oil. However, in principle, any liquid may be utilized for this purpose.

Two embodiments of the invention are represented diagrammatically on the annexed drawings, Fig. 1 of which shows the case in which the entire amount of fluid discharged from the brake flows through the regulating valves. Fig. 2 shows the other case, in which the regulating valves control the amount of fluid in circulation in the system by means of a special regulating tank, whereby the valves may be held in a normally closed position. Fig. 3 shows a particular embodiment of the valves as a mechanical unit.

Referring to Fig. 1, the numerals 1 and 2 represent the brake and its outlet conduit, respectively. From the outlet 2 the oil passes to the cooler 3 and on to the reservoir 4, from which it flows through the inlet conduit 5 back to the brake.

The pressure at the beginning of the outlet conduit 2 equals the pressure at the periphery of the bulk of liquid rotating in the brake and is thus determined mainly by the speed of revolution of the brake and the amount of oil contained in it. Now, this pressure makes the oil circulate in the system. If the amount of oil in the brake be increased (at constant brake speed) the outlet conduit pressure will increase also and a regulation of the amount of oil in the brake may obviously be effected in response to the outlet conduit pressure. In the present case the brake is constructed so as to offer no back pressure in the inlet conduit 5. This result may be attained, for instance, if the inlet 5 enters the brake in the central space free from oil, which is created when the oil is forced peripherally during rotation.

In the outlet conduit 2 is placed a valve 6, which is actuated in its opening direction by the pressure in the outlet conduit 2. It is further actuated towards its closed position by a regulating force, which in the case in hand has been assumed derived from a hydraulic system, which is in connection with the valve by conduit 7. A check valve 11a prevents flow in the opposite direction. In the inlet conduit 5 to the brake is placed a valve 8, which is actuated towards its closed position by the outlet pressure over the tube 9 and which is actuated in the opening direction by a regulating force. In the case of Fig. 1 the regulating force has been assumed derived from the same source of pressure as the regulating force on valve 6 and brought to the valve 8 over the tube conduit 10.

The function of the arrangement described is as follows:

An increase in regulating pressure (in conduits 7 and 10) causes the valve 6 to move towards closing and the valve 8 towards opening. The flow resistance of the outlet conduit 2 has increased, thus the rate of flow from the brake will decrease. The inflow of oil into the brake, on the other hand, will increase, in consequence of the opening of the valve 8 and the result will be an increase in the amount of oil in the brake. As a result of this the pressure set up by the brake in the outlet conduit 2 increases and this reaction of adjustment will continue until the outlet pressure has grown to balancing the increased regulating pressure on the valves 6, 8. The new state of stability thus attained corresponds to a greater amount of oil in the brake and therefore to a greater braking moment than the initial state. It is obvious that a decrease in regulating pressure will, in a corresponding manner, decrease the braking moment.

Fig. 2 shows a modification of the invention. The numerals 1' to 8', inclusive, denote similar parts as in Fig. 1. With regard to these parts, the only difference in comparison with Fig. 1 is that the inlet and outlet conduits 2', 5' with their valves now lead direct to and from the reservoir 4', respectively, by-passing the cooler 3'. The valves 6', 8' can then be held normally closed and be operated only to increase or diminish the amount of oil circulating through the brake and cooler.

In the balanced state the oil will flow from the brake 1' through the first part of the outlet conduit 2', the cooler inlet conduit 11, the cooler 3', the cooler outlet conduit 12, and the inlet conduit 5' back to the brake. The other part 13 of the outlet conduit 2' now leads direct to the reservoir 4' and the outlet pressure actuates the piston of the valve 6' in the opening direction. A regulating force, which may, for instance, be derived from the pressure in a hydraulic system connected to the valve through the conduit 7', holds the valve 6' normally closed. The brake inlet conduit includes the valve 8', which is actuated towards closing through the conduit 9' by the pressure in the outlet conduit 2' and towards opening by a regulating force. This force may be derived, for example, through the conduit 10' from the pressure in the same hydraulic system which actuates the valve 6'.

This arrangement functions in the following way: Upon a decrease in the regulating pressure (in 7', 10') below the outlet pressure (in 2') the valve 6' will open. This may, of course, require a compensation for the weight of the valve piston, for example by means of a spring device, as indicated in Fig. 2 at the valves 6', 8'. The position of the valve 8' is not now affected. Thus some of the oil will flow from the circulation system formed by the brake and the cooler into the reservoir 4' until equalization of pressures has occurred, the result being a decrease in the braking moment. This presupposes, as was stated above, that no empty spaces can form in the circulation system outside the brake.

At an increase in regulating pressure (or, in the case of separate regulating pressures, in that on valve 8') the valve 8' opens in a corresponding manner and the amount of oil circulating in the system increases until the pressure in the outlet conduit 2' has grown to be able to compensate for the increase in opening force on the valve.

The hydraulic connection between the valves 6, 6' and 8, 8' shown in Figs. 1 and 2 may be replaced by a mechanical connection, such as shown in Fig. 3, the numerical designations of which are double-primed (") but otherwise correspond to those previously used in that correspondingly designated parts have an analogous function. Two piston heads 6", 8", functionally corresponding to the valves 6", 8" of the previous modifications, make up a sliding piston unit, which is actuated in one direction by the outlet pressure (in 2") and in the opposite direction by a regulating force, for instance a hydraulic system pressure (through conduit 7'). As is easily seen from the figure, motion of the piston from the position shown will open a passage for the oil in a way corresponding to that shown in Fig. 2, the analogy between the two devices being obvious.

The invention may be utilized for automatic regulation of the tested engine, for instance to maintain constant its moment or speed. A constant speed regulating device is represented diagrammatically applied to the embodiment of the invention shown in Fig. 2. It would naturally be possible to apply the same principle to the arrangement of Fig. 1.

In Fig. 2 the numeral 14 designates the engine being tested. Combined with it is a transmitting device, represented here in the form of a centrifugal governor, which controls the actuating pressure (in 7'). The governor operates a piston 18 through some kind of mechanical transmission, such as a lever 16 and a spring 17, thus regulating the force on the valves 6', 8'.

This arrangement functions as follows:

Upon an increase in engine speed the centrifugal governor 15 tends to increase the hydraulic regulating pressure by lowering the piston 18 by means of the lever 16 and spring 17, as appears directly from the figure. This causes the valve to regulate in a previously described manner the amount of oil in the brake so as to increase the braking moment, which in turn increases the engine load so as to reduce the speed.

The transmitting device may obviously be of various kinds. The centrifugal governor shown is only an example serving to illustrate the functional principle. Any speed-sensitive device attached to the engine should be able to serve as a transmitting device. Thus the engine could drive an electric generator, the voltage of which, being proportional to its speed of revolution, could be supplied to some electromagnetic valve-regulating means. The valve regulating forces could then, without the introduction of a hydraulic system, be derived from the electromagnetic means, which would imply great possibilities of adjustment.

Irrespective of the type of transmitting device chosen facilities should be provided for manual adjustment of the state of equilibrium which the transmitting device tends to maintain so that the engine can be automatically regulated towards an adjustable speed.

In a similar manner a constant moment regulation of the engine can be obtained. The transmitting device may then be a movable member actuated by some dynamometrical device, which measures the moment of the engine. The deviations of the movable member from a predetermined, preferably manually adjustable, position (of equilibrium) produce regulating forces, which actuate the valve in such a manner that the engine moment is changed in a manner tending to counteract and reduce the deviation from equilibrium In an arrangement such as that illustrated in Fig. 2 the rate of flow of the oil should be commensurate to the capacity of the cooler and to the heat energy generated by the brake. For a predetermined type of cooler the rate of flow should vary so that at the absolute top effect of the brake it is still sufficient to prevent the liquid from reaching excessive temperatures.

The rate of oil flow through the system is a function of the pressure driving the oil through the system. The pressure in turn varies with the energy consumed by the brake. This is apparent from the fact that both the driving pressure, which, it will be remembered, equals the pressure in the brake outlet conduit, and the energy consumed are substantially determined by the R. P. M. and the amount of oil in the brake.

It is important that the system should be designed so as to give a suitable variation of rate of flow with brake effect. With regard to the system of circulation this may be achieved in two fundamentally different ways One way is to give the system such characteristics that a suitable interrelation of driving pressure and rate of flow is obtained, which establishes the desirable relationship between rate of flow and brake effect. It is, however, also possible to install automatic regulating means, which influence the resistance to oil flow of the system in accordance with the variations in some suitable characteristic factor depending on the brake effect.

A realization of the first-mentioned method, which has yielded satisfactory practical results, is to design the system of circulation in such a way that the rate of flow as a function of the driving pressure increases more slowly at higher pressures or, in mathematical terms, that the second derivative of the rate of flow, with respect to the driving pressure, is negative.

The simplest relationship fulfilling these requirements is when the rate of flow is proportional to the square root of the pressure. This relationship essentially characterizes a constricted passage without appreciable friction or viscosity effect such as may be formed by an annular flange in a tube. If, therefore, a constricting flange 19 is inserted in the system of circulation, for instance in the cooler inlet conduit 11, this will result in a relationship between the pressure and the rate of flow, which approaches the desired type to the extent that the resistance of the constricting flange forms a substantial part of the resistance of the system.

According to the second method a throttle valve may be inserted in the system, the action of which is automatically regulated in dependence of the brake effect. In particular a regulation in dependence of the temperature of the oil in the outlet conduit or the difference between this temperature and that of the oil entering the brake may be suitable. With this method an increase in temperature (or temperature difference) should cause a decrease in flow resistance of the system.

I claim:

1. In a brake liquid circulatory apparatus for a hydraulic brake which comprises an inlet conduit for the brake, an outlet conduit for the brake, a cooler connected to the inlet conduit and to the outlet conduit whereby brake liquid flows into the cooler from the outlet conduit and out of the cooler into the inlet conduit, a brake liquid reservoir in communication with said conduits, an inlet valve for controlling the flow of liquid from the reservoir to the inlet conduit, said inlet valve having an operating member adapted to open and close it, an outlet valve for controlling the flow of liquid to the reservoir from the outlet conduit, said outlet valve being urged towards open position by the liquid in the outlet conduit, and adjustable means for urging the inlet valve towards open position and for urging the outlet valve towards closed position, the improvement which comprises means subject to the pressure of the liquid in the outlet conduit for operating the operating member of said inlet valve to urge said inlet valve towards closed position.

2. The improvement in a brake liquid circulatory apparatus in accordance with claim 1 which includes means in the outlet conduit for reducing the pressure of the liquid in said outlet conduit, said means being located in said outlet conduit outwardly from the brake and beyond that portion of the outlet conduit connected to the brake liquid reservoir through said outlet valve.

3. The improvement in a brake liquid circulatory apparatus in accordance with claim 2 in which the means in the outlet conduit for reducing the pressure of the liquid in the outlet conduit consists of a restriction placed within the outlet conduit.

4. In a brake liquid circulatory apparatus for a hydraulic brake which comprises an inlet conduit for the brake, an outlet conduit for the brake, a cooler connected to the inlet conduit and to the outlet conduit whereby brake liquid flows into the cooler from the outlet conduit and out of the cooler into the inlet conduit, a brake liquid reservoir in communication with said conduits, an inlet valve for controlling the flow of liquid from the reservoir to the inlet conduit, said inlet valve having an operating member adapted to open and close it, an outlet valve for controlling the flow of liquid to the reservoir from the outlet conduit, said outlet valve being urged towards open position by the liquid in the outlet conduit, and adjustable means for urging the inlet valve towards open position and for urging the outlet valve towards closed position, the improvement which comprises a conduit placing said outlet conduit in communication with said operating member of the inlet valve to urge said inlet valve toward closed position by the action of the pressure of the liquid in said outlet conduit on said operating member.

5. The improvement in a brake liquid circulatory apparatus in accordance with claim 4 which includes means in the outlet conduit for reducing the pressure of the liquid in said outlet conduit, said means being located in said outlet conduit outwardly from the brake and beyond that portion of the outlet conduit connected to the brake liquid reservoir through said outlet valve.

6. In a brake liquid circulatory apparatus for a hydraulic brake which comprises an inlet conduit for the brake, an outlet conduit for the brake, a cooler connected to the inlet conduit and to the outlet conduit whereby brake liquid flows into the cooler from the outlet conduit and out of the cooler into the inlet conduit, a brake liquid reservoir in communication with said conduits, an inlet valve for controlling the flow of liquid from the reservoir to the inlet conduit, said inlet valve having an operating member adapted to open and close it, an outlet valve for controlling the flow of liquid to the reservoir from the outlet conduit, said outlet valve being urged towards open position by the liquid in the outlet conduit, and adjustable means for urging the inlet valve towards open position and for urging the outlet valve towards closed position, the improvement which comprises a conduit placing said outlet conduit in communication with said operating member of the inlet valve to urge said inlet valve toward closed position by the action of the pressure of the liquid in said outlet conduit on said operating member, and a constricting flange in the outlet conduit for reducing the pressure of the liquid in the outlet conduit, said constricting flange being located in said outlet conduit outwardly from the brake and beyond that portion of the outlet conduit connected to the brake liquid reservoir through said outlet valve.

BO NILSSON HOFFSTROM.

REFERENCES CITED

The following references are of record in the file of this patent:

UNITED STATES PATENTS

| Number | Name | Date |
| --- | --- | --- |
| 1,035,700 | Harrison | Aug. 13, 1912 |
| 1,462,778 | Walker | July 24, 1923 |
| 1,992,910 | La Mater | Feb. 26, 1935 |
| 2,116,992 | Weaver | May 10, 1938 |
| 2,162,541 | Walker | June 13, 1939 |

FOREIGN PATENTS

| Number | Country | Date |
| --- | --- | --- |
| 552,586 | Great Britain | Apr. 15, 1943 |

OTHER REFERENCES

Heenan & Froude Ltd. Catalogue (Worcester, England), Catalogue No. S.80/1, Dec. 1927.